US008829323B2

(12) United States Patent
Segal

(10) Patent No.: US 8,829,323 B2
(45) Date of Patent: Sep. 9, 2014

(54) SYSTEM AND METHOD FOR SINGLE-USER CONTROL OF MULTIPLE ROLES WITHIN A MUSIC SIMULATION

(75) Inventor: Edo Segal, New York, NY (US)

(73) Assignee: Talent Media LLC, New York, NY (US)

( * ) Notice: Subject to any disclaimer, the term of this patent is extended or adjusted under 35 U.S.C. 154(b) by 734 days.

(21) Appl. No.: 13/030,363

(22) Filed: Feb. 18, 2011

(65) Prior Publication Data

US 2012/0214587 A1    Aug. 23, 2012

(51) Int. Cl.
*G10H 1/00* (2006.01)
*G10H 1/18* (2006.01)
*G10H 7/00* (2006.01)
*A63F 13/06* (2006.01)

(52) U.S. Cl.
CPC ......... *A63F 13/06* (2013.01); *A63F 2300/8047* (2013.01); *A63F 2300/1081* (2013.01); *A63F 2300/105* (2013.01); *A63F 2300/632* (2013.01)
USPC .......................................................... 84/615

(58) Field of Classification Search
USPC ........................................... 84/609, 615, 653
See application file for complete search history.

(56) References Cited

U.S. PATENT DOCUMENTS

| | | | |
|---|---|---|---|
| 7,723,604 B2 * | 5/2010 | Bang et al. ...................... | 84/615 |
| 7,985,917 B2 * | 7/2011 | Morris et al. ................... | 84/637 |
| 8,317,614 B2 * | 11/2012 | McCauley et al. .............. | 463/37 |
| 8,426,716 B2 * | 4/2013 | Little et al. ...................... | 84/613 |
| 8,445,769 B2 * | 5/2013 | Takahashi ........................ | 84/737 |
| 2004/0154460 A1 * | 8/2004 | Virolainen et al. ............. | 84/645 |
| 2004/0159219 A1 * | 8/2004 | Holm et al. ..................... | 84/645 |
| 2006/0060068 A1 * | 3/2006 | Hwang et al. ................... | 84/615 |
| 2007/0240559 A1 * | 10/2007 | Hasebe ............................ | 84/637 |
| 2007/0256541 A1 * | 11/2007 | McCauley ....................... | 84/600 |

OTHER PUBLICATIONS

"Guitar Hero." Wikipedia Wikimedia Foundation, Feb. 11, 2007. Web. <http://en.wikipedia.org/wiki/Guitar_Hero>.
"Rock Band (video Game)." Wikipedia. Wikimedia Foundation, Apr. 2, 2007. Web. <http://en.wikipedia.org/wiki/Rock_Band_(video_game)>.

* cited by examiner

*Primary Examiner* — Jeffrey Donels
(74) *Attorney, Agent, or Firm* — Leason Ellis LLP

(57) ABSTRACT

Systems and methods are provided for enhancing interaction with a music simulation program. A controller interacts with the music simulation program in conjunction with a motion sensor to enable selection from among various operating modes, each representing a musical instrument or role. Distinct gestures and/or movements are detected by the motion sensor and serve to switch among the various modes during the course of the duration of a song or video without interrupting the progression of the song/video or gameplay.

5 Claims, 4 Drawing Sheets

SYSTEM AND METHOD FOR SINGLE-USER CONTROL OF MULTIPLE ROLES WITHIN A MUSIC SIMULATION

TECHNICAL FIELD OF THE INVENTION

This disclosure relates generally to the field of interaction with a music simulation program, and, in particular, to systems and methods for single-user control of multiple roles within a music simulation program.

BACKGROUND OF THE INVENTION

Various multimedia programs and games are presently available which allow the user to simulate and/or participate in the playing/recording of music. For instance, many video games (such as Guitar Hero and Rock Band®) enable one or more users to simulate the playing of various musical instruments (such as guitar, drums, keyboard, etc.) through interaction with video game controllers. Furthermore, certain versions of these games on various video gaming platforms allow the user to utilize specially constructed controllers which more accurately simulate the playing style of the instrument they represent. In order to further simulate the 'band' experience, some games allow for the simultaneous connection of multiple specialized controllers (for instance, one guitar-controller, one keyboard-controller, and one drum kit-controller). In such a scenario, each of the individual players selects one controller/instrument to play, and the users play together simultaneously as a virtual "band."

A conceptually similar idea is at work in the well known field of karaoke. In karaoke, a machine plays an instrumental recording of well-known song wherein the vocal track(s) are removed. A display screen simultaneously presents the lyrics of the song to the user in coordination with the progression of the song being played. One or more users are provided with microphones, using the microphones to provide the vocal element(s) of the song. Audio and/or video recording of the user's performance of the song is also possible in certain systems.

While known music simulation games enable multiple users to simulate the playing of multiple instruments simultaneously, no such platform exists for enabling a single user to achieve multi-instrument gameplay. Furthermore, no platform currently exists for enabling a single user interface to record multiple instruments.

It is with respect to these and other considerations that the disclosure made herein is presented.

SUMMARY OF THE INVENTION

Technologies are presented herein for a system and method for enhancing interaction with a music simulation program. According to one aspect, a system and method are provided, including a processor, a control circuit operatively connected to the processor, and a memory accessible by the processor and including the music simulation program which is executable by the processor to provide a user-interaction with a song or a video for a prescribed duration of the song or the video, respectively. Also included are a controller interactively coupled with the music simulation program and operable in at least a first interactive mode and a second interactive mode to provide an output to a user, each interactive mode being mutually exclusively selectable by the user for operation throughout the prescribed duration, and comprising, relative to one another, a unique selection of a musical instrument or a microphone. A motion sensor is operatively connected to the control circuit, and a motion control application comprising one or more software modules is encoded in the memory and executable in the processor so as to configure the control circuit, in response to an input from the motion sensor to generate a selection-control signal based on the input and to switch the controller from one of the at least first and second interactive modes to another of the at least first and second interactive modes in response to the selection-control signal, whereby the user-interaction with the controller during the prescribed duration of the song or the video is included in the output to the user, including any switching from one musical instrument or microphone to another.

According to another aspect, a system and method are provided, including a processor, a control circuit operatively connected to the processor, a memory operatively connected to the control circuit and accessible by the processor, and a motion sensor operatively connected to the control circuit and the user controller. One or more software modules are encoded in the memory which executes a motion control application in the processor. The music simulation enables at least a first gameplay experience relating to a first musical instrument and a second gameplay experience relating to a second musical instrument and the user controller has at least a first operating mode corresponding to the first musical instrument, and a second operating mode corresponding to the second musical instrument. The motion control application, when executed by the processor, configures the control circuit to receive a unique gesture-based input from the motion sensor, the input corresponding to a selection of either the first musical instrument or the second musical instrument, generate a control signal based on the input and corresponding to either the first operating mode or the second operating mode, adjust the operation of the user controller based on the control signal and in accordance with either the first operating mode or the second operating mode; and receive an input from the user controller in furtherance of the music simulation to interact with either the first gameplay experience or the second gameplay experience.

These and other aspects, features, and advantages can be appreciated from the accompanying description of certain embodiments of the invention and the accompanying drawing figures.

DETAILED DESCRIPTION OF CERTAIN EMBODIMENTS OF THE INVENTION

The following detailed description is directed to systems and methods for enhancing interaction with a music simulation program. References are made to the accompanying drawings that form a part hereof, and which are shown by way of illustration through specific embodiments, arrangements, and examples.

Figure 1:
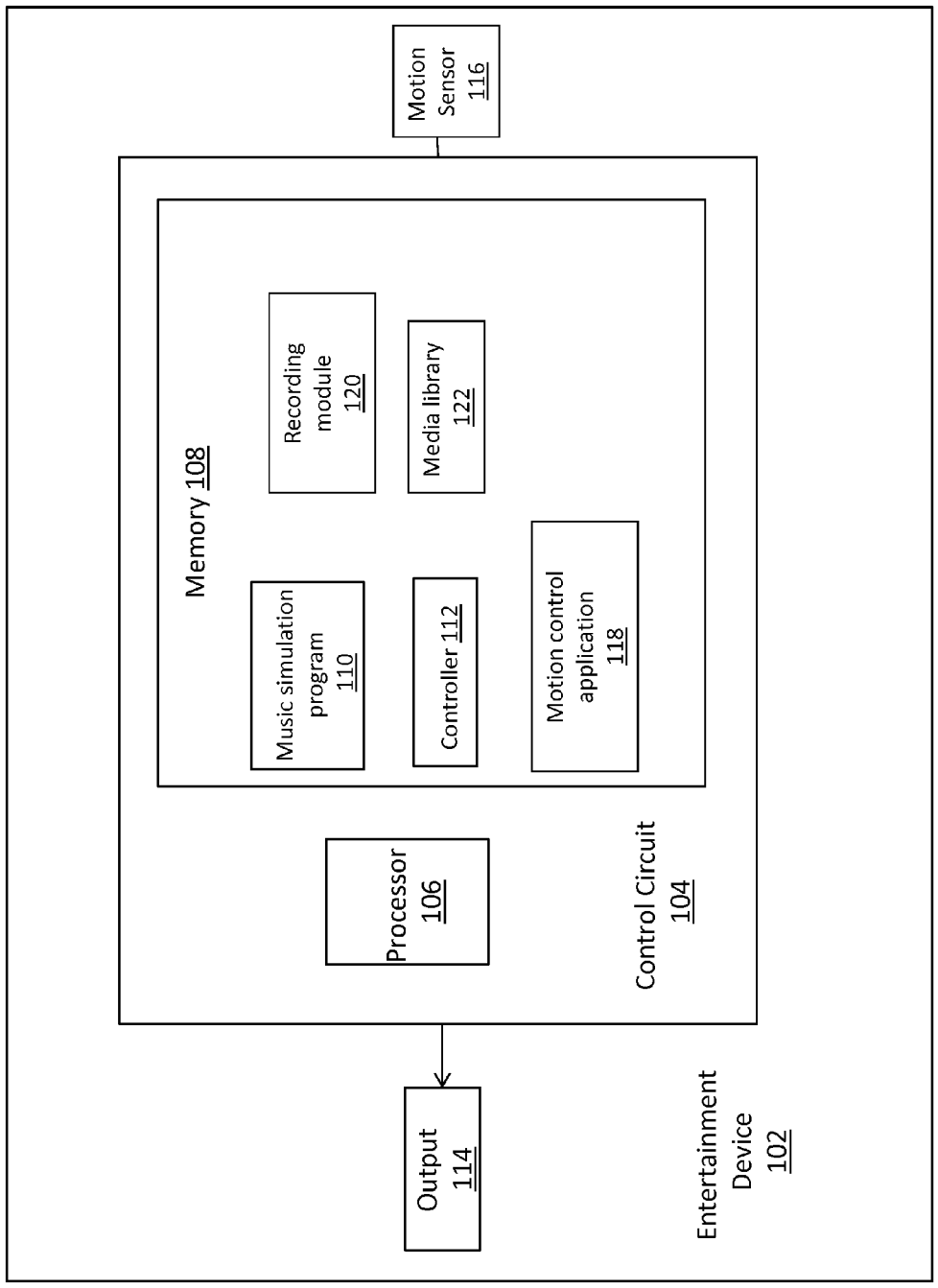
FIG. 1 is a high-level diagram of an entertainment device in accordance with one exemplary embodiment.

Referring now to the drawings, it is to be understood that like numerals represent like elements through the several figures, and that not all components and/or steps described and illustrated with reference to the figures are required for all embodiments or arrangements. FIG. 1 is a high-level diagram illustrating an exemplary configuration of an entertainment device 102. In one arrangement, entertainment device 102 can be a personal media device (such as an iPad® or iPod®), a smartphone (such as an iPhone® or an Android powered device), personal computer, or any other such device capable of embodying the systems and/or methods described herein. It should be noted that in alternate arrangements, various elements of entertainment device 102 can be distributed across several connected components, such as in the case of an Xbox® or Playstation® 3 gaming system, as will be described in greater detail below.

Entertainment device 102 includes a control circuit 104 which is operatively connected to various hardware and software components that serve to enable and/or enhance interaction with a music simulation program. The control circuit 104 is operatively connected to a processor 106 and a memory 108. Preferably, memory 108 is accessible by processor 106, thereby enabling processor 106 to receive and execute instructions stored on memory 108.

Stored or encoded on memory 108 is a music simulation program 110. The music simulation program 110 is preferably a software program, application, and/or one or more modules that is/are executable by processor 106. In one arrangement, music simulation program 110 is an interactive video game that simulates the playing of one or more musical instruments. In another arrangement, music simulation program 110 is an interactive software program that enables the playing and/or recording of one or more audio and/or video tracks.

In one arrangement, music simulation program 110, when executed by processor 106, accesses and/or interacts with one or more media libraries 122. Media libraries 122 can include audio and/or video files or tracks. Music simulation program 110 can access these files and/or tracks and play one or more of them for the user, and can further record and store new files and/or tracks, and/or modify existing files and/or tracks, as will be described in greater detail below. In an alternate arrangement, music simulation program 110 can be pre-loaded with audio and/or video files or tracks, and thus not require further access to media libraries 122. In operation, music simulation program enables user-interaction with one or more songs and/or videos for a prescribed duration of the song and/or the video, in a manner described in greater detail below.

Also stored or encoded on memory 108 is controller 112. In one arrangement, controller 112 is a software program, application, and/or one or more modules that is/are executable by processor 106. Preferably, controller 112 is a software program 112 that is interactively coupled with music simulation program 110, and that further enables enhanced interaction with music simulation program 110. Controller 112 preferably operates in one of a plurality of interactive modes to provide one or more outputs 114 to a user. The various interactive modes are preferably mutually exclusively selectable by the user for operation throughout the prescribed duration of the one or more audio and/or video files or tracks referenced above. The various interactive modes include one or more musical instruments, and/or a microphone (that is, a vocal mode). Prior to and during the duration of the one or more audio and/or video files or tracks, the user can select from among the various interactive modes in a manner described in greater detail below.

The outputs 114 provided to the user can include a number of audio, video, and or tactile responses. These outputs 114 are generally provided in response to instructions given by the controller 112 and or the music simulation program 110. By way of example, an output such as the playing of a video or the graphical depiction of a gameplay interaction can be provided to a screen (not shown) connected to or incorporated within entertainment device 102 in response to instructions from controller 112 or music simulation program 110. By way of further example, an output such as the playing of a song or the audio depiction of a gameplay interaction can be provided to one or more audio speakers connected to or incorporated within entertainment device 102.

A motion sensor 116 is operatively connected to control circuit 104. Motion sensor 116 is preferably a motion sensing device such as a gyroscope, accelerometer, motion detection camera, or any other such device or combination of devices capable of sensing, detecting, and/or determining varying degrees of movement.

Additionally, a motion control application 118 is stored/encoded on memory 108. The motion control application 118 is preferably a software program, application, and/or one or more modules that is/are executable by processor 106. Upon execution, the motion control application 118 configures control circuit 104, in response to one or more inputs from motion sensor 116, to generate a selection-control signal based on the received input, and to switch the controller 112 from one interactive mode to another interactive mode. That is, in response to a particular input from motion sensor 116 (such as a distinct movement or gesture), motion control application 118 generates a selection-control signal which directs controller 112 and/or music simulation program 110 to switch the operation of controller 112 from one interactive mode to another interactive mode.

By way of example, a first particular input from motion sensor 116 can correspond to the selection of a guitar interactive mode, while a second particular input from motion sensor 116 can correspond to the selection of a microphone/vocal interactive mode. When motion sensor 116 detects a particular gesture (such as the rotation of entertainment device 102 90 degrees clockwise) associated with the guitar interactive mode, it provides an input that is received by motion control application 118. In response, motion control application 118 generates a selection-control signal which directs controller 112 and/or music simulation program 110 to switch the operation of controller 112 away from a current mode to the guitar interactive mode. Similarly, a 90 degree counter-clockwise rotation of the entertainment device 102 can select a different mode such as the microphone/vocal interactive mode, thus switching the operation of controller 112 from a current interactive mode to the microphone/vocal interactive mode.

In operation, the user preferably interacts with the entertainment device 102 that is executing music simulation program 110. During the execution of music simulation program 110, such as during the duration of a song or video, the user can gesture, move, or otherwise activate motion sensor 116. For instance, the user can rotate entertainment device 102 90 degrees in a particular direction, shake the entertainment device, tap the entertainment device, or otherwise move or activate the device in a distinctive or unique way. The motion sensor 116 sends, and the motion control application 118 receives an input which corresponds to the user's distinctive gesture or movement. In response, the motion control application 118 generates a selection-control signal which serves to switch the controller from a first interactive mode to a second interactive mode (that is, the controller is switched to the interactive mode corresponding to the distinctive gesture or movement detected by the motion sensor 116). This user interaction with the controller, including any switching between various interactive modes (e.g., musical instruments), which occurs during the duration of the song or video, as well as the results of these interactions, are included in the output to the user (e.g., output to a video display and/or audio projection device). Thus, the user's interaction with the music simulation program 110 is enhanced in that the user can gesture or move entertainment device 102 and thereby switch between one or more interactive modes seamlessly and without any interruption to the ongoing duration of the song or video being played. In doing so, the user has the ability to play various instruments (interactive modes) during the playback of a single song/video.

It should be noted that the gestures or movements that are detected by motion sensor 116 and in turn received by motion control application 118, as described above, can be customized based on a variety of criteria. While various gestures/movements are assigned default settings, the user can further edit or modify these settings, and/or define new gestures or movements, and may further change the association between a particular gesture and a particular interactive mode/instrument.

It should be further noted that a recording module 120 is also preferably stored or encoded on memory 108. In one arrangement, recording module 120 is a software program, application, and/or one or more modules that is/are executable by processor 106. Recording module 120 enables the recording and storage of music/sound and/or video tracks and/or files that are generated though user interaction with entertainment device 102 in the manner described herein. Preferably, recording module 120 is a software program that is operatively coupled with music simulation program 110, and that further enables enhanced interaction with music simulation program 110, though in certain arrangements recording module 120 can stand alone and operate independently, without the presence of the music simulation program 110. The recorded songs, videos, and/or tracks can be stored in media library 122, or in another user specified storage location.

By way of example, music simulation program 110 can be configured to execute while augmenting a previously recorded song, video, or track with a further recording, using recording module 120. In doing so, the user may add additional audio and/or video elements (such as additional instrumental or vocal tracks, or additional video elements) that are incorporated within the previously recorded song/video, thereby creating an updated/enhanced version of the previously recorded song/video. Recording module 120 can store the updated/enhanced songs/videos in media library 122, or elsewhere, either by overwriting the previously recorded song/video, or by saving updated/enhanced version as new file/set of files.

Figure 2:
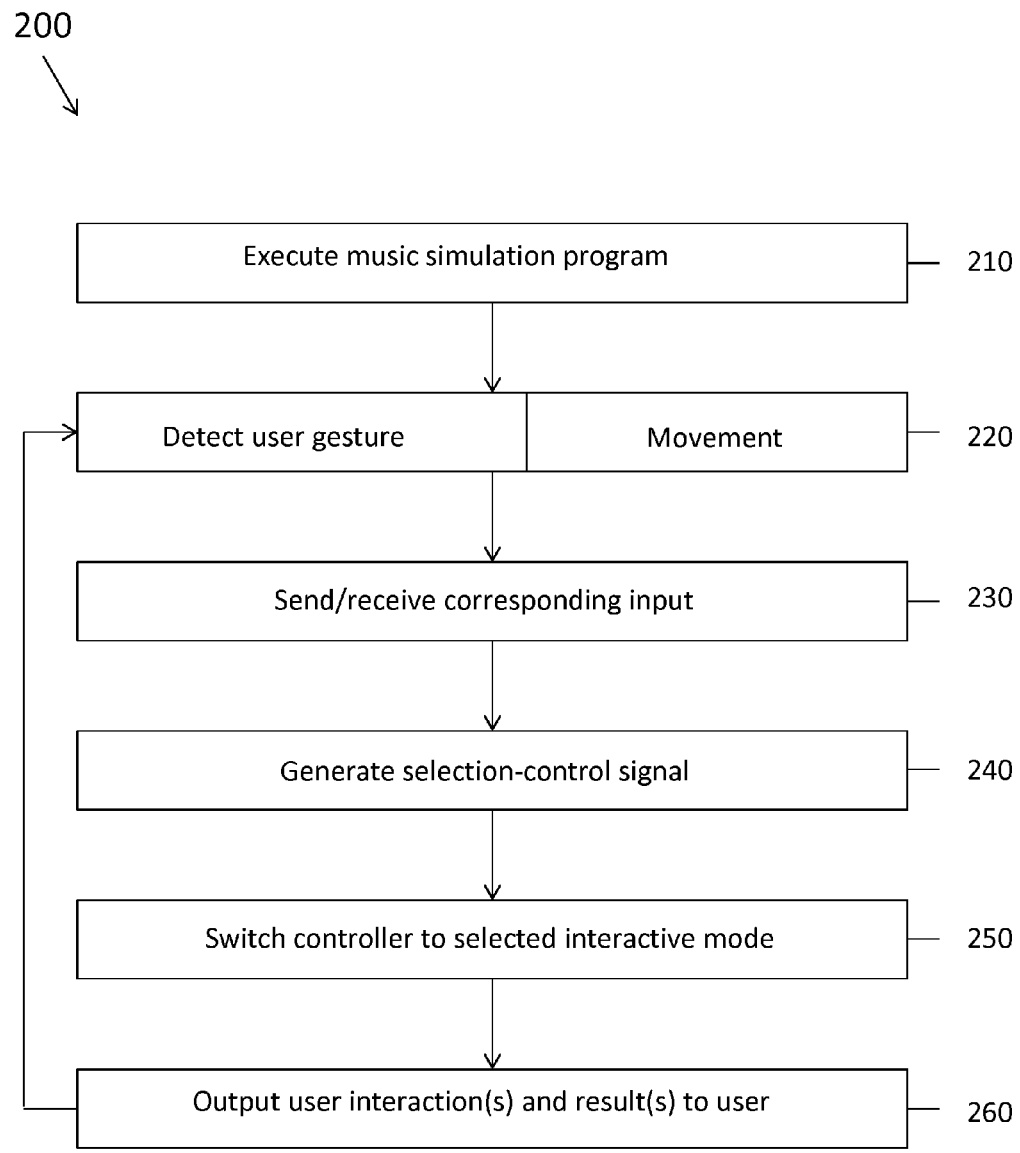
FIG. 2 is a flow diagram illustrating a method for enhancing interaction with a music simulation program in accordance with one exemplary embodiment.

Turning now to FIG. 2, a flow diagram is described showing a routine 200 that illustrates a broad aspect of a method for enhancing interaction with a music simulation program in accordance with at least one embodiment disclosed herein. It should be appreciated that several of the logical operations described herein are implemented (1) as a sequence of computer implemented acts or program modules running on mobile device 102 and/or (2) as interconnected machine logic circuits or circuit modules within the mobile device 102. The implementation is a matter of choice dependent on the requirements of the device (e.g., size, energy, consumption, performance, etc.). Accordingly, the logical operations described herein are referred to variously as operations, structural devices, acts, or modules. Several of these operations, structural devices, acts and modules can be implemented in software, in firmware, in special purpose digital logic, and any combination thereof. It should also be appreciated that more or fewer operations can be performed than shown in the figures and described herein. These operations can also be performed in a different order than those described herein.

The process 200 begins at step 210, where music simulation program 110 is executed, as described in detail above. At step 220, motion sensor 116 detects and/or is activated by one or more user gestures/movements, as described above. Then, at step 230, motion sensor 116 sends, and the motion control application 118 receives an input which corresponds to the user's distinctive gesture or movement. The input identifies the nature of the movement of the device 102 (e.g., a rotation about an axis normal to a screen that is incorporated within device 102). At step 240, the motion control application 118 generates a selection-control signal. In particular, the module analyzes the input data relative to a current mode (as may be stored in the memory 108) and a selection-control signal is generated using that information and the instructions imported to the processor 106 by the music simulation program 110. At step 250, the selection-control signal serves to switch the controller from a first interactive mode to a second interactive mode in accordance with the music simulation program code. Then, at step 260, the various user interactions with the controller, including any switching between various interactive modes (e.g., musical instruments), as well as the results of these interactions, are output to the user (e.g., output to a video display and/or audio projection device). The process 200 then continues by returning to step 220 where a further gesture/movement is detected.

Figure 3:
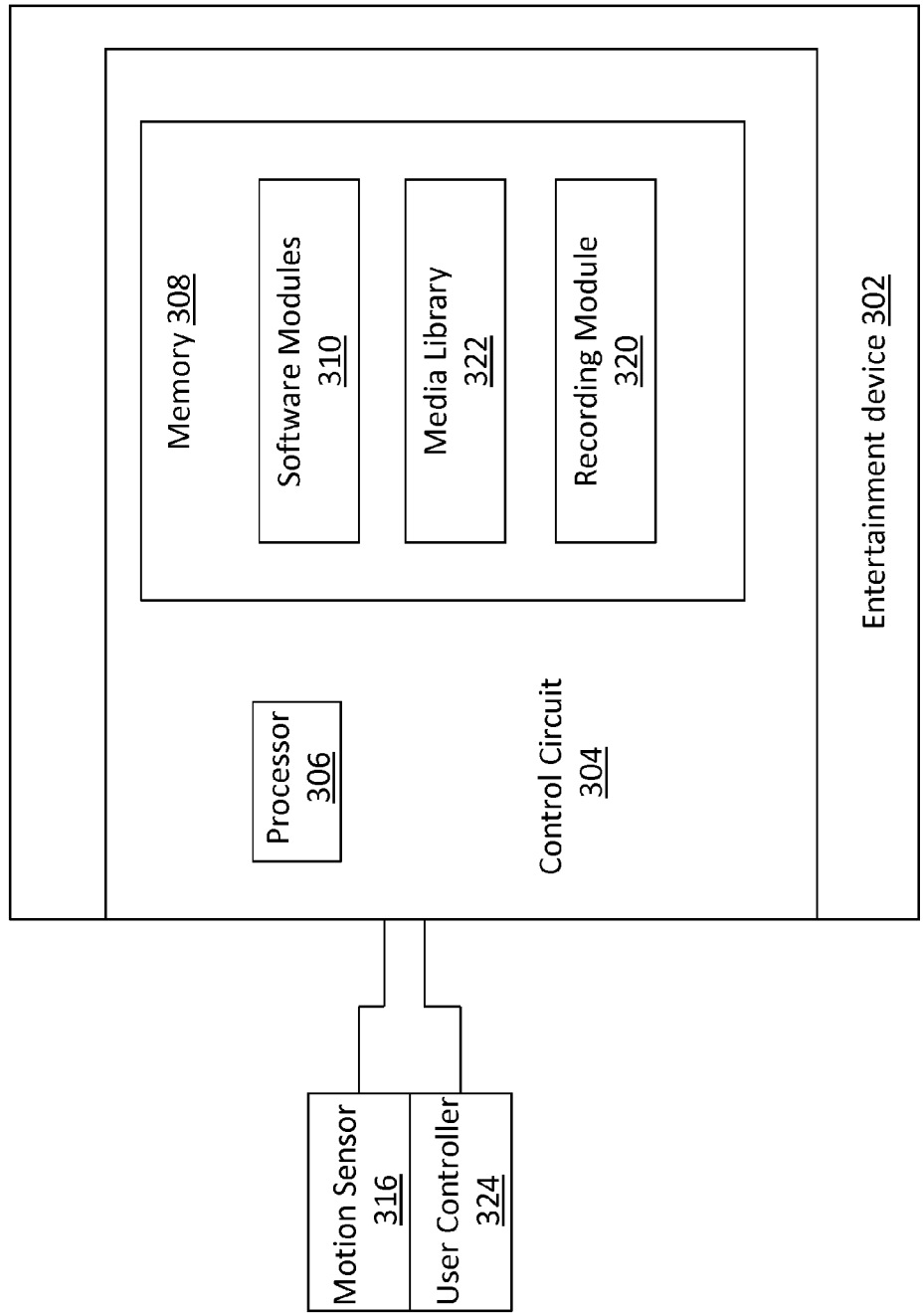
FIG. 3 is a high-level diagram of an entertainment device in accordance with another exemplary embodiment.

Turning now to FIG. 3, a high level diagram of an entertainment device 302 in accordance with another exemplary embodiment is provided. It should be noted that although structurally distinct, entertainment device 302 and the present description thereof is substantially similar, and is ultimately directed towards the same objectives as the system and method described above with respect to FIGS. 1-2. In one arrangement, entertainment device 302 can be a computing device such as a personal computer, or a gaming device such as an Xbox® or Playstation® 3 gaming system. Operatively connected to entertainment device 302 is preferably a user controller 324, such as a user controller, which can be practically any device capable of providing commands to entertainment device 302, such as a video game controller, remote control, keyboard, mouse, iPad®, iPod®, smartphone, etc. or any other such device capable of embodying the systems and/or methods described herein. It should be noted that in alternate arrangements, various elements of entertainment device 302 and user controller 324 can be combined and unified within a single entertainment device 302, such as an tablet computer (such as the iPad®) or smartphone.

Entertainment device 302 includes a control circuit 304 which is operatively connected to various hardware and software components that serve to enable and/or enhance interaction with a music simulation, such as a music simulation program. The control circuit 304 is operatively connected to a processor 306 and a memory 308. Preferably, memory 308 is operatively connected to control circuit 304 and is accessible by processor 306, thereby enabling processor 306 to receive and execute instructions stored on memory 308.

A motion sensor 316 is operatively connected to control circuit 304 and also to user controller 324. Preferably, motion sensor 316 can be integrated within user controller 324 such that all movements of user controller 324 are detected by motion sensor 316. In an alternate embodiment, motion sensor 316 can be distinct from user controller 324 such that motion sensor 316 detects motion independent of the motion of user controller 324. Motion sensor 116 is preferably a motion sensing device such as a gyroscope, accelerometer, motion detection camera, or any other such device or combination of devices capable of sensing, detecting, and/or determining varying degrees of movement.

One or more software modules 310, including the music simulation program referenced above and a motion control application, are encoded in memory 308 and executed in the processor 306. The music simulation program is preferably a software program, application, and/or one or more modules that is/are executable by processor 306. In one arrangement, the music simulation program is an interactive video game that simulates the playing of one or more musical instruments, preferably with respect to time-coded audio and/or video. In another arrangement, the music simulation program is an interactive software program that enables the playing and/or recording of one or more audio and/or video tracks. During execution, the music simulation program enables at least a first gameplay experience relating to a first musical instrument and a second gameplay experience relating to a second musical instrument, as will be described in greater detail below.

In one arrangement, the music simulation program, when executed by processor 306, accesses and/or interacts with one or more media libraries 322. Media libraries 322 can include audio and/or video files or tracks. The music simulation program can access these files and/or tracks and play one or more of them for the user, and can further record and store new files and/or tracks, and/or modify existing files and/or tracks, as will be described in greater detail below. In an alternate arrangement, the music simulation program can be pre-loaded with audio and/or video files or tracks, and thus not require further access to media libraries 322. In operation, music simulation program enables user-interaction with one or more songs and/or videos for a prescribed duration of the song and/or the video, in a manner described in greater detail below.

User controller 324 preferably has at least a first operating mode corresponding to a first musical instrument (for example, a guitar or keyboard), and a second operating mode corresponding to a second musical instrument (for example, drums or a microphone/vocal input). Preferably, user controller 324 is operatively connected to control circuit 304 (such as through a wired or wireless communication interface) and is further interactively coupled with the music simulation program, thereby enabling enhanced interaction with the music simulation program. User controller 324 preferably operates in one of a plurality of operating modes, each of which correspond to various musical instruments/roles. The various operating modes are preferably mutually exclusively selectable by the user for operation throughout a prescribed duration of the one or more audio and/or video files or tracks referenced above. The various operating modes include one or more musical instruments, and/or a microphone (that is, a vocal mode). Prior to and during the duration of the one or more audio and/or video files or tracks, the user can select from among the various operating modes in a manner described in greater detail below.

In operation, the user preferably interacts with the entertainment device 302 that is executing the music simulation program through user controller 324 and/or motion sensor 316. During the execution of the music simulation program, such as during the duration of a song or video, the user can gesture, move, or otherwise activate motion sensor 316. For instance, in an arrangement where the motion sensor 316 is incorporated into user controller 324, the user can rotate user controller 324 90 degrees in a particular direction, shake user controller 324, tap the user controller 324, or otherwise move or activate the motion sensor 316 in a distinctive or unique way. In an alternative arrangement, where motion sensor 316 is separate from user controller 324, the user can similarly activate motion sensor 316 without further interaction with user controller 324. By way of example, motion sensor 316 can be a motion sensing camera which detects a specific user movement or gesture. The motion sensor 316 sends, and the control circuit 304 receives a unique gesture-based input that corresponds to a selection of either the first musical instrument or the second musical instrument. Then, the control circuit 304, in conjunction with the various executing software modules 310, generates a control signal based on the input and corresponding to either the first operating mode or the second operating mode. Based on the generated control signal and in accordance with the selected operating mode, the control circuit 304 adjusts the operation of the user controller 324. The control circuit further receives an input from the user controller 324 in furtherance of the music simulation to interact with either the first gameplay experience or the second gameplay experience. The motion control application can further configure the control circuit 304 to switch between the selected operating mode and another operating mode in response to a control signal without interruption to a time-coded media sequence. The various user interaction with the controller 324, and the music simulation, including any switching between various operating modes (e.g., musical instruments), which occurs during the duration of the song or video, as well as the results of these interactions, can be further included in the output to the user (e.g., output to a video display and/or audio projection device). Thus, the user's interaction with the music simulation program is enhanced, in that the user can gesture, move, or otherwise activate controller 324 and/or motion sensor 316, and thereby switch between one or more operating modes seamlessly and without any interruption to the ongoing duration of the song or video being played. In doing so, the user has the ability to play various instruments (operating modes) during a single song/video.

By way of example, a first particular input from motion sensor 316 can correspond to the selection of a guitar interactive mode, which a second particular input from motion sensor 316 can correspond to the selection of a microphone/vocal interactive mode. When motion sensor 316 detects a particular gesture (such as the rotation of user controller 324 90 degrees clockwise, where the motion sensor 316 is integrated with the controller 324, or the raising and lowering of a user's left foot by a motion sensing camera) associated with the guitar operating mode, a corresponding control signal is generated in the manner disclosed above, and the operation of the user controller 324 is adjusted in accordance with the guitar operating mode. Similarly, a 90 degree counter-clockwise rotation of the user controller 324, or the raising and lowering of a user's right foot by a motion sensing camera can select the microphone/vocal interactive mode, thus switching the operation of user controller 324 from the guitar operating mode to the microphone/vocal operating mode.

It should be noted that the gestures or movements that are detected by motion sensor 316, as described above, can be customized based on a variety of criteria. While various gestures/movements are assigned default settings, the user can further edit or modify these settings, and/or define new gestures or movements, and may further change the association between a particular gesture and a particular operating mode/instrument.

It should be further noted that a recording module 320 is also preferably stored or encoded on memory 308. In one arrangement, recording module 320 is a software program, application, and/or one or more modules that is/are executable by processor 306. Recording module 320 enables the recording and storage of music/sound and/or video tracks and/or files that are generated though user interaction with entertainment device 302 and controller 324 in the manner described herein. Preferably, recording module 320 is a software program that is interactively coupled with the music simulation program, and that further enables enhanced interaction with the music simulation program, though in certain arrangements recording module 320 can stand alone and operate independently, without the presence of the music simulation program. The recorded songs, videos, and/or tracks can be stored in media library 322, or in another user specified storage location.

By way of example, the music simulation program can be configured to execute while augmenting a previously recorded song, video, or track with a further recording, using recording module 320. In doing so, the user may add additional audio and/or video elements (such as additional instrumental or vocal tracks, or additional video elements) that are incorporated within the previously recorded song/video, thereby creating an updated/enhanced version of the previously recorded song/video. Recording module 320 can store the updated/enhanced songs/videos in media library 322, or elsewhere, either by overwriting the previously recorded song/video, or by saving updated/enhanced version as new file/set of files.

Figure 4:
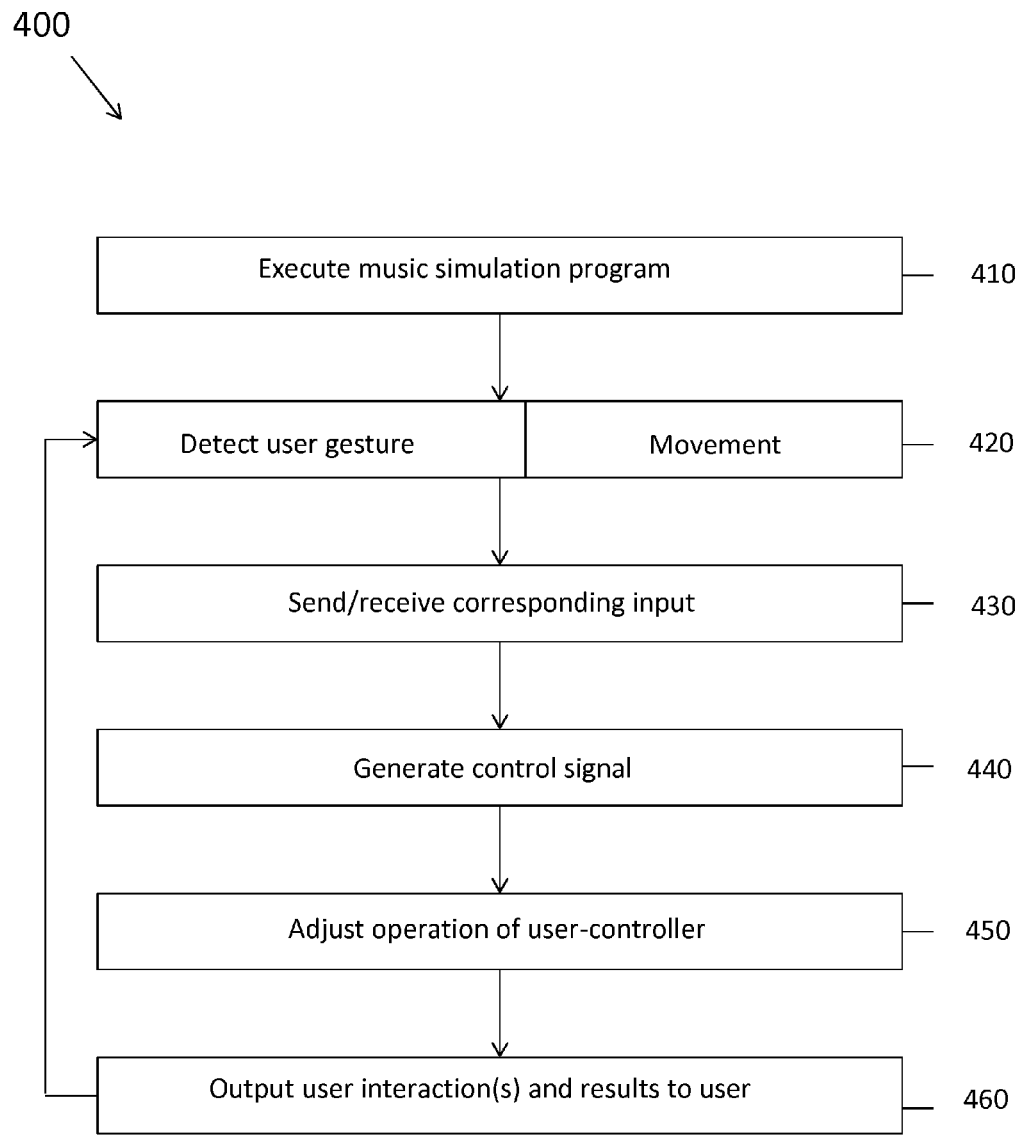
FIG. 4 is a flow diagram illustrating a method for compensating for enhancing interaction with a music simulation program in accordance with another exemplary embodiment.

Turning now to FIG. 4, a flow diagram is described showing a routine 400 that illustrates a broad aspect of a method for enhancing interaction between a user controller 324 and a music simulation in accordance with at least one embodiment disclosed herein. It should be appreciated that several of the logical operations described herein are implemented (1) as a sequence of computer implemented acts or program modules running on mobile device 102 and/or (2) as interconnected machine logic circuits or circuit modules within the mobile device 102. The implementation is a matter of choice dependent on the requirements of the device (e.g., size, energy, consumption, performance, etc.). Accordingly, the logical operations described herein are referred to variously as operations, structural devices, acts, or modules. Several of these operations, structural devices, acts and modules can be implemented in software, in firmware, in special purpose digital logic, and any combination thereof. It should also be appreciated that more or fewer operations can be performed than shown in the figures and described herein. These operations can also be performed in a different order than those described herein.

The process 400 begins at step 410, where the music simulation program is executed, as described in detail above. At step 420, motion sensor 316 detects and/or is activated by one or more user gestures/movements, as described above. Then, at step 430, motion sensor 316 sends, and the control circuit 304 receives a unique gesture-based input that corresponds to a selection of either the first musical instrument or the second musical instrument. The input identifies the nature of the movement detected by the motion sensor 316 (e.g. a rotation of the controller 324 about its axis). At step 440, the control circuit 304, in conjunction with the various executing software modules 310, generates a control signal based on the input and corresponding to either the first operating mode or the second operating mode. In particular, the modules analyze the input data relative to a current mode (as may be stored in the memory 308) and a control signal is generated using that information and the instructions imported to the processor 306 by the music simulation program. At step 450, the control circuit 304 adjusts the operation of the user controller 324, based on the generated control signal and in accordance with the selected operating mode and the music simulation program code. Then, at step 460, the various user interactions with the controller 324, and the music simulation, including any switching between various operating modes (e.g., musical instruments), which occurs during the duration of the song or video, as well as the results of these interactions, can be further included in the output to the user (e.g., output to a video display and/or audio projection device). The process 400 then continues by returning to step 420 where a further gesture/movement is detected.

It should be noted that while the various systems and methods described above are discussed herein specifically with respect to music, video, various musical instruments, etc., can be applied and implemented in many other contexts and industries. For instance, the detection and use of the referenced unique gestures can be implemented in the context of other, non-music centered applications and games, such as action/adventure games, fighting games, etc. Practically any application or game that requires the coordination of multiple inputs within a short timeframe would benefit from the implementation of the system and method described herein.

The subject matter described above is provided by way of illustration only and should not be construed as limiting. Various modifications and changes can be made to the subject matter described herein without following the example embodiments and applications illustrated and described, and without departing from the true spirit and scope of the present invention, which is set forth in the following claims.

What is claimed is:

1. A system for enhancing interaction with a music simulation program, the system comprising:
    a processor;
    a control circuit operatively connected to the processor;
    a memory accessible by the processor and including the music simulation program which is executable by the processor to provide a user-interaction with a song or a video for a prescribed duration of the song or the video, respectively;
    a controller interactively coupled with the music simulation program and operable in at least a first interactive mode and a second interactive mode to provide an output to a user, each interactive mode being mutually exclusively selectable by the user for operation throughout the prescribed duration, and comprising, relative to one another, a unique selection of a musical instrument or a microphone; and
    a motion sensor operatively connected to the control circuit; and
    a motion control application comprising one or more software modules encoded in the memory and executable in the processor so as to configure the control circuit, in response to an input from the motion sensor:
    to generate a selection-control signal based on the input; and
    to switch the controller from one of the at least first and second interactive modes to another of the at least first and second interactive modes in response to the selection-control signal;
    whereby the user-interaction with the controller during the prescribed duration of the song or the video is included in the output to the user, including any switching from one musical instrument or microphone to another.

2. The system of claim 1, wherein the motion sensor comprises a gyroscope.

3. The system of claim 1, wherein the controller comprises code executing in the processor.

4. The system of claim 1, further comprising a recording module operative during the prescribed duration to record the song or the video including the user-interaction with the controller.

5. The system of claim 4, wherein the music simulation program is configured to execute while augmenting a previously recorded song or video with a further recording.

\* \* \* \* \*